US010970202B1

United States Patent
Kirkpatrick et al.

(10) Patent No.: US 10,970,202 B1
(45) Date of Patent: *Apr. 6, 2021

(54) MANAGING INPUT/OUTPUT ('I/O') REQUESTS IN A STORAGE SYSTEM THAT INCLUDES MULTIPLE TYPES OF STORAGE DEVICES

(71) Applicant: Pure Storage, Inc., Mountain View, CA (US)

(72) Inventors: Peter Kirkpatrick, Mountain View, CA (US); John Colgrove, Los Altos, CA (US); Neil Vachharajani, Menlo Park, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,386

(22) Filed: Mar. 5, 2019

Related U.S. Application Data

(63) Continuation of application No. 15/667,860, filed on Aug. 3, 2017, now Pat. No. 10,255,176, which is a
(Continued)

(51) Int. Cl.
*G06F 12/02* (2006.01)
*G06F 3/06* (2006.01)
*G06F 12/10* (2016.01)

(52) U.S. Cl.
CPC ............ *G06F 12/023* (2013.01); *G06F 3/068* (2013.01); *G06F 3/0619* (2013.01);
(Continued)

(58) Field of Classification Search
None
See application file for complete search history.

(56) References Cited

U.S. PATENT DOCUMENTS 5,706,210 A 1/1998 Kumano et al.
5,799,200 A 8/1998 Brant et al.
(Continued)

FOREIGN PATENT DOCUMENTS

EP 0725324 A2 8/1996
EP 3384375 A1 10/2018
(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.
(Continued)

*Primary Examiner* — Kevin Verbrugge

(57) ABSTRACT

Writing data in a storage system that includes a first type of storage device and a second type of storage device, including: selecting, for one or more unprocessed write requests, a target storage device type from the first type of storage device and the second type of storage device; issuing a first group of write requests to the first type of storage device, the first group of write requests addressed to one or more locations selected in dependence upon an expected address translation to be performed by the first type of storage device; and issuing a second group of write requests to the second type of storage device, the second group of write requests addressed to one or more locations selected in dependence upon a layout of memory in the second type of storage device.

17 Claims, 5 Drawing Sheets

Related U.S. Application Data continuation of application No. 14/956,841, filed on Dec. 2, 2015, now Pat. No. 9,760,479.

(52) U.S. Cl.
CPC .......... *G06F 3/0631* (2013.01); *G06F 3/0659* (2013.01); *G06F 3/0683* (2013.01); *G06F 3/0685* (2013.01); *G06F 12/10* (2013.01)

(56) References Cited

U.S. PATENT DOCUMENTS

| | | |
|---|---|---|
| 5,933,598 A | 8/1999 | Scales et al. |
| 6,012,032 A | 1/2000 | Donovan et al. |
| 6,085,333 A | 7/2000 | DeKoning et al. |
| 6,353,879 B1 | 3/2002 | Middleton et al. |
| 6,643,641 B1 | 11/2003 | Snyder |
| 6,647,514 B1 | 11/2003 | Umberger et al. |
| 6,678,752 B1 | 1/2004 | Ashton et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,124,569 B2 | 9/2015 | Hussain et al. |
| 9,134,922 B2 | 9/2015 | Rajagopal et al. |
| 9,209,973 B2 | 12/2015 | Aikas et al. |
| 9,250,823 B1 | 2/2016 | Kamat et al. |
| 9,256,542 B1 | 2/2016 | Flower et al. |
| 9,300,660 B1 | 3/2016 | Borowiec et al. |
| 9,444,822 B1 | 9/2016 | Borowiec et al. |
| 9,501,473 B1 | 11/2016 | Kong et al. |
| 9,507,532 B1 | 11/2016 | Colgrove et al. |
| 9,830,092 B2 | 11/2017 | McKean et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0276882 A1 | 11/2007 | Nishimura et al. |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0095053 A1 | 4/2010 | Bruce et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2011/0197024 A1 | 8/2011 | Thomas |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0173953 A1 | 7/2012 | Flynn et al. |
| 2012/0284458 A1 | 11/2012 | Foster et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0173855 A1 | 7/2013 | Kim et al. |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0254482 A1 | 9/2013 | Ishizaki et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0032834 A1 | 1/2014 | Cudak et al. |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0089565 A1 | 3/2014 | Lee et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0115240 A1 | 4/2014 | Jin et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |

(56) References Cited

U.S. PATENT DOCUMENTS

| | | |
|---|---|---|
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0100746 A1* | 4/2015 | Rychlik ............ G06F 12/0607 711/157 |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0378888 A1 | 12/2015 | Zhang et al. |
| 2016/0098323 A1 | 4/2016 | Mutha et al. |
| 2016/0246519 A1 | 8/2016 | McKean et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2017/0161184 A1 | 6/2017 | Colgrove et al. |
| 2017/0177222 A1 | 6/2017 | Singh et al. |

FOREIGN PATENT DOCUMENTS

| | | |
|---|---|---|
| WO | WO-2012/087648 A1 | 6/2012 |
| WO | WO-2013071087 A1 | 5/2013 |
| WO | WO-2014/110137 A1 | 7/2014 |
| WO | WO-2016/015008 A1 | 12/2016 |
| WO | WO-2016/190938 A1 | 12/2016 |
| WO | WO-2016/195759 A1 | 12/2016 |
| WO | WO-2016/195958 A1 | 12/2016 |
| WO | WO-2016/195961 A1 | 12/2016 |
| WO | WO-2017/095567 A1 | 6/2017 |

OTHER PUBLICATIONS

PCMag, *Storage Array Definition*, Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia, *What is a disk array*, techopedia.com (online), Jan. 13, 2012, 1 page, URL: web.archive.org/web/20120113053358/http://www.techopedia.com/definition/1009/disk-array.

Webopedia, *What is a disk array*, webopedia.com (online), May 26, 2011, 2 pages, URL: web/archive.org/web/20110526081214/http://www.webopedia.com/TERM/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dictzip file format*, GitHub.com (online), accessed Jul. 28, 2015, 1 page, URL: github.com/fidlej/idzip.

Wikipedia, *Convergent Encryption*, Wikipedia.org (online), accessed Sep. 8, 2015, 2 pages, URL: en.wikipedia.org/wiki/Convergent_encryption.

Storer et al., *Secure Data Deduplication*, Proceedings of the 4th ACM International Workshop on Storage Security and Survivability (StorageSS'08), Oct. 2008, 10 pages, ACM New York, NY. USA, DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 17 pages, URL: download.microsoft.com/download/E/A/E/EAE57CD1-A80B-423C-96BB-142FAAC630B9/Hybrid_Identity_Datasheet.pdf.

Bellamy-McIntyre et al., *OpenID and the Enterprise: A Model-based Analysis of Single Sign-On Authentication*, 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Kong, *Using PCI Express as the Primary System Interconnect in Multiroot Compute, Storage, Communications and Embedded Systems*, White Paper, IDT.com (online), Aug. 28, 2008, 12 pages, URL: www.idt.com/document/whp/idt-pcie-multi-root-whitepaper.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Jul. 18, 2016, 12 pages.

International Search Report and Written Opinion, PCT/US2016/015008, dated May 4, 2016, 12 pages.

International Search Report and Written Opinion, PCT/US2016/020410, dated Jul. 8, 2016, 12 pages.

International Search Report and Written Opinion, PCT/US2016/032084, dated Jul. 18, 2016, 12 pages.

International Search Report and Written Opinion, PCT/US2016/016333, dated Jun. 8, 2016, 12 pages.

International Search Report and Written Opinion, PCT/US2016/032052, dated Aug. 30, 2016, 17 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

International Search Report and Written Opinion, PCT/US2016/059715, dated Feb. 2, 2017, 11 pages.

* cited by examiner

MANAGING INPUT/OUTPUT ('I/O') REQUESTS IN A STORAGE SYSTEM THAT INCLUDES MULTIPLE TYPES OF STORAGE DEVICES

CROSS-REFERENCE TO RELATED APPLICATION

This application is a continuation application of and claims priority from U.S. patent application Ser. No. 15/667,860, filed Aug. 3, 2017, which is a continuation application of and claims priority from U.S. Pat. No. 9,760,479, issued Sep. 12, 2017.

BACKGROUND OF THE INVENTION

Field of the Invention

The field of the invention is data processing, or, more specifically, methods, apparatus, and products for writing data in a storage system that includes a first type of storage device and a second type of storage device.

Description of Related Art

Enterprise storage systems can provide large amounts of computer storage to modern enterprises. Such storage systems may be expected to be scalable, provide higher reliability, and provide for better fault tolerance relative to consumer storage.

SUMMARY OF THE INVENTION

Methods, apparatuses, and products for writing data in a storage system that includes a first type of storage device and a second type of storage device, including: selecting, for one or more unprocessed write requests, a target storage device type from the first type of storage device and the second type of storage device; responsive to selecting the first type of storage device, issuing, by a storage array controller, a first group of write requests to the first type of storage device, the first group of write requests addressed to a location selected in dependence upon an expected address translation to be performed by the first type of storage device; and responsive to selecting the second type of storage device, issuing, by the storage array controller, a second group of write requests to the second type of storage device, the second group of write requests addressed to a location selected in dependence upon a layout of memory in the second type of storage device.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
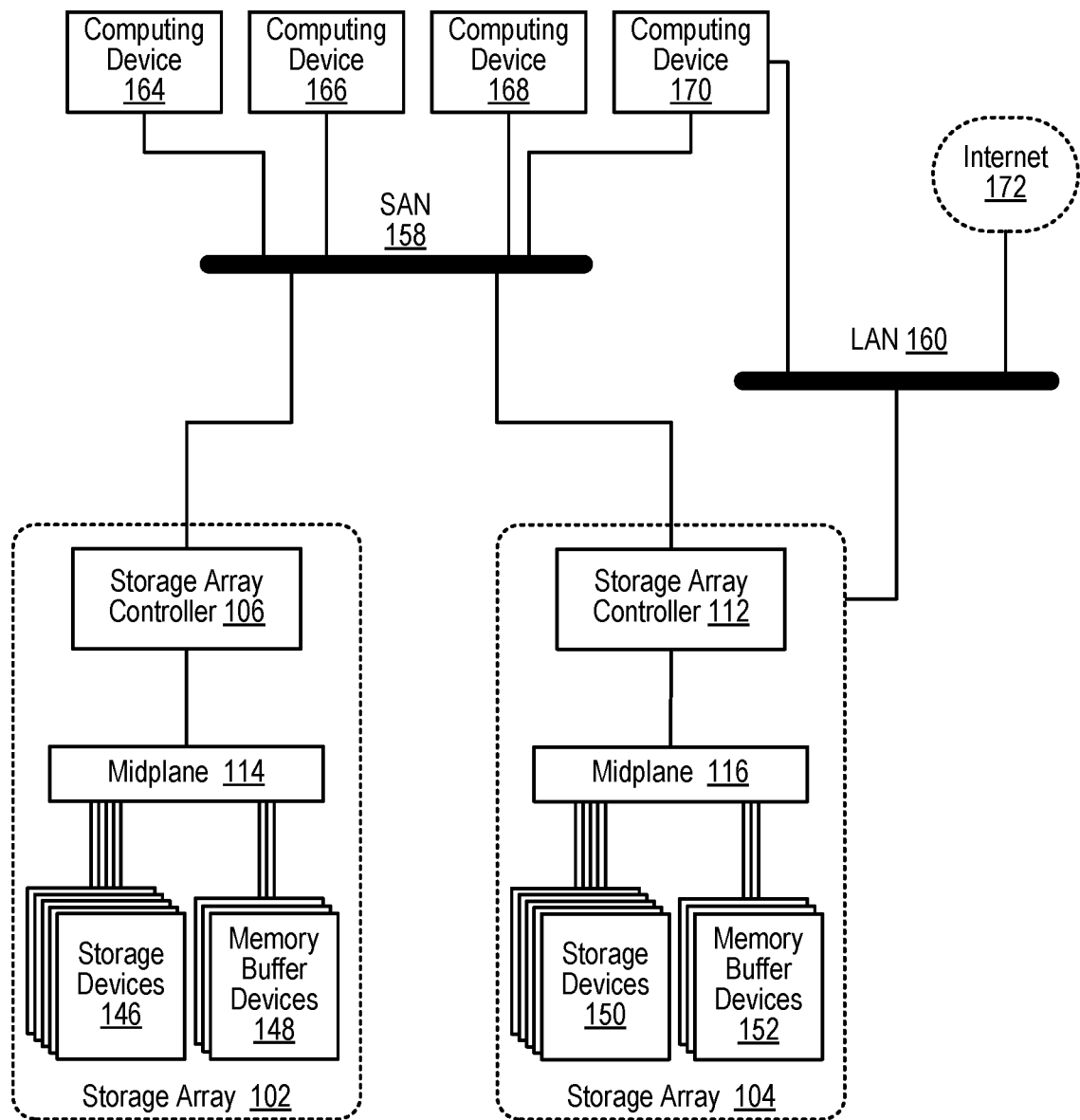
FIG. 1 sets forth a block diagram of a system that includes a first type of storage device and a second type of storage device according to embodiments of the present disclosure.

Example methods, apparatus, and products for writing data in a storage system that includes a first type of storage device and a second type of storage device in accordance with the present disclosure are described with reference to the accompanying drawings, beginning with FIG. 1. FIG. 1 sets forth a block diagram of a system that includes a first type of storage device and a second type of storage device according to embodiments of the present disclosure. The system of FIG. 1 includes a number of computing devices (164, 166, 168, 170). The computing devices (164, 166, 168, 170) depicted in FIG. 1 may be implemented in a number of different ways. For example, the computing devices (164, 166, 168, 170) depicted in FIG. 1 may be embodied as a server in a data center, a workstation, a personal computer, a notebook, or the like.

The computing devices (164, 166, 168, 170) in the example of FIG. 1 are coupled for data communications to a number of storage arrays (102, 104) through a storage area network (SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP') and others as will occur to those of skill in the art.

The example storage arrays (102, 104) of FIG. 1 provide persistent data storage for the computing devices (164, 166, 168, 170). The storage arrays (102, 104) of FIG. 1 provide persistent data storage for the computing devices (164, 166, 168, 170) at least in part through the use of one of more storage devices (146, 150). A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives ('SSDs'), and the like.

Readers will appreciate that in the example depicted in FIG. 1, the storage devices (146) in a first storage array (102) may include storage devices of different types, and the storage devices (150) in a second storage array (104) may include storage devices of different types. The different types of storage devices may be embodied, for example, as SSDs that handle incoming write requests in different ways. For example, a first type of storage device may be embodied as an SSD that receives a write request addressed to a particular address and performs an internal address translation that ultimately results in data that is associated with the write request being written to a location that is dependent upon the internal address translation that is performed by the SSD. In contrast, the second type of storage device may not perform any internal address translation, such that the second type of storage device writes the data that is associated with the write request to a location that is selected entirely by the storage array controller (106, 112) and in no way subject to an internal translation performed by the SSD.

Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of write buffer devices (148, 152). The storage array controllers (106, 112) of FIG. 1 may be configured for writing data in a storage system that includes a first type of storage device and a second type of storage device, including: selecting, for one or more unprocessed write requests, a target storage device type from the first type of storage device and the second type of storage device; responsive to selecting the first type of storage device, issuing, by a storage array controller, a first group of write requests to the first type of storage device, the first group of write requests addressed to a location selected in dependence upon an expected address translation to be performed by the first type of storage device; and responsive to selecting the second type of storage device, issuing, by the storage array controller, a second group of write requests to the second type of storage device, the second group of write requests addressed to a location selected in dependence upon a layout of memory in the second type of storage device, as will be described in greater detail below.

Each write buffer device (148, 152) may be configured to receive, from the storage array controller (106, 112), data to be stored in the storage devices (146). Such data may originate from any one of the computing devices (164, 166, 168, 170). In the example of FIG. 1, writing data to the write buffer device (148, 152) may be carried out more quickly than writing data to the storage device (146, 150). The storage array controller (106, 112) may be configured to effectively utilize the write buffer devices (148, 152) as a quickly accessible buffer for data destined to be written to storage. In this way, the latency of write requests may be significantly improved relative to a system in which the storage array controller writes data directly to the storage devices (146, 150).

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Writing data in a storage system that includes a first type of storage device and a second type of storage device in accordance with embodiments of the present disclosure is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful in writing data in a storage system that includes a first type of storage device and a second type of storage device according to embodiments of the present disclosure.

Figure 2:
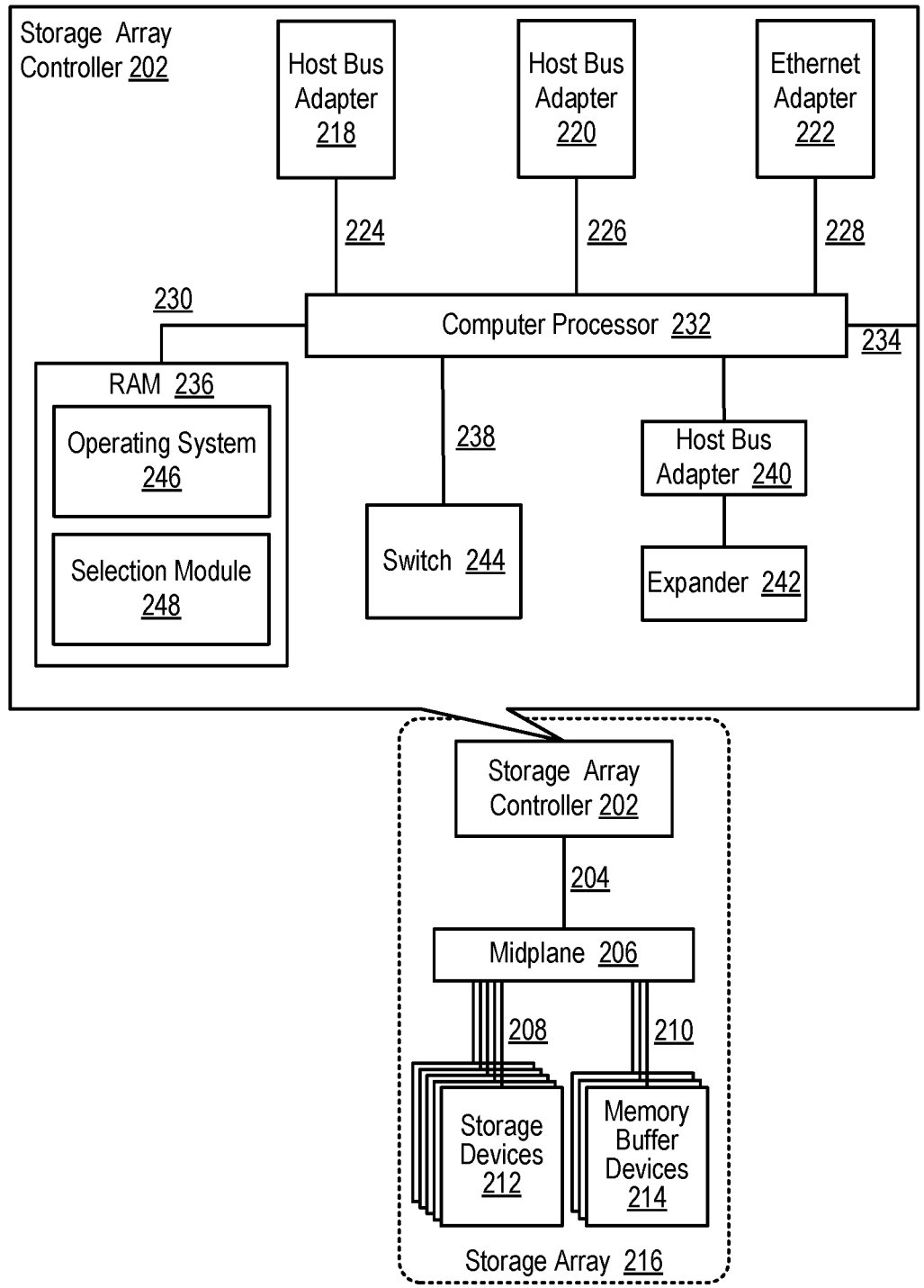
FIG. 2 sets forth a block diagram of a storage array controller (202) useful in writing data in a storage system that includes a first type of storage device and a second type of storage device according to embodiments of the present disclosure.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more memory buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (236) is an operating system (246). Examples of operating systems useful in storage array controllers (202) configured for writing data in a storage system that includes a first type of storage device and a second type of storage device according to embodiments of the present disclosure include UNIX™, Linux™, Microsoft Windows™, and others as will occur to those of skill in the art. Also stored in RAM (236) is a selection module (248), a module that includes computer program instructions useful in writing data in a storage system that includes a first type of storage device and a second type of storage device. The selection module (248) may be configured for: selecting, for one or more unprocessed write requests, a target storage device type from the first type of storage device and the second type of storage device; responsive to selecting the first type of storage device, issuing, by a storage array controller, a first group of write requests to the first type of storage device, the first group of write requests addressed to a location selected in dependence upon an expected address translation to be performed by the first type of storage device; and responsive to selecting the second type of storage device, issuing, by the storage array controller, a second group of write requests to the second type of storage device, the second group of write requests addressed to a location selected in dependence upon a layout of memory in the second type of storage device, as will be described in greater detail below, as will be described in greater detail below. Readers will appreciate that while the selection module (248) and the operating system (246) in the example of FIG. 2 are shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
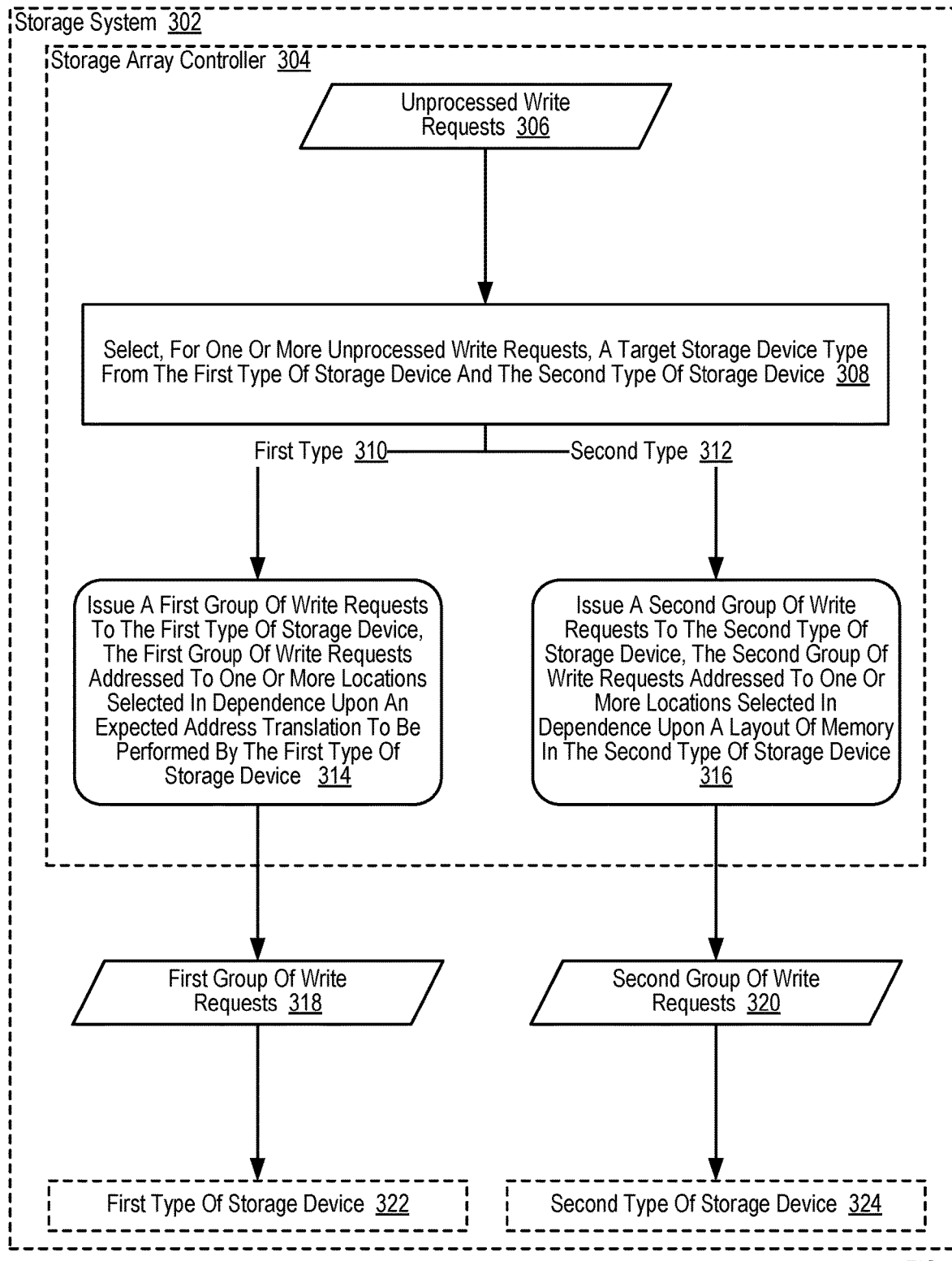
FIG. 3 sets forth a flow chart illustrating an example method for writing data in a storage system that includes a first type of storage device and a second type of storage device according to embodiments of the present disclosure.

For further explanation, FIG. 3 sets forth a flow chart illustrating an example method for writing data in a storage system (302) that includes a first type of storage device (322) and a second type of storage device (324) according to embodiments of the present disclosure. The storage system (302) depicted in FIG. 3 may be similar to the storage system described above with reference to FIG. 1, and may include a plurality of storage devices (324, 326, 328) such as SSDs and NVRAM storage devices as described above. The storage system (302) depicted in FIG. 3 may also include a storage array controller (304) that is similar to the storage array controllers described above with reference to FIG. 1 and FIG. 2.

The storage system (302) depicted in FIG. 3 includes a first type of storage device (322) and a second type of storage device (324). The first type of storage device (322) and the second type of storage device (324) may be embodied, for example, as solid-state drives ('SSDs') that handle incoming write requests in different ways. For example, the first type of storage device (322) may be embodied as an SSD that receives a write request addressed to a particular address and performs an internal address translation that ultimately results in data that is associated with the write request being written to a location that is dependent upon the internal address translation that is performed by the SSD. In contrast, the second type of storage device (324) may not perform any internal address translation, such that the second type of storage device (324) writes the data that is associated with the write request to a location that is selected entirely by the storage array controller (304) and is in no way subject to an internal translation performed by the SSD.

The example method depicted in FIG. 3 includes selecting (308), for one or more unprocessed write requests (306), a target storage device type from the first type of storage device (322) and the second type of storage device (324). The one or more unprocessed write requests (306) represent requests to write data to the storage system (302). Such write requests (306) may be initiated by a user of the storage system and received by the storage array controller (304) via a SAN or other data communications network. Such write requests are designated as being 'unprocessed' to indicate that the storage array controller (304) has not yet caused data to be written to any of the storage devices (322, 324) in response to receiving the write requests. In the example method depicted in FIG. 3, selecting (308) a target storage device type from the first type of storage device (322) and the second type of storage device (324) may be carried out, for example, through the use of one or more selection rules that take into account various factors such as, for example, the amount of storage capacity available on a particular storage device, the amount of time that a particular storage device would require to service one or more write requests, the number of times that one or more portions of a particular storage device have been programmed and erased, and so on.

The storage array controller (304) may select (308) a target storage device type for the purpose of identifying one or more storage devices that are intended to be used for servicing the one or more unprocessed write requests (306). In different situations, different storage devices may be selected for servicing the one or more unprocessed write requests (306). For example, the storage array controller (304) may select (308) the target storage device type that is intended to be used for servicing the one or more unprocessed write requests (306) by selecting the type of storage device that has the least amount of wear, by selecting the type of storage device that has the largest amount of available storage, by selecting the type of storage device that offers the fastest write latency, by selecting the type of storage device that offers the best performance according to some other performance metric, and so on. Readers will appreciate that the storage array controller (304) may select (308) the target storage device type that is intended to be used for servicing the one or more unprocessed write requests (306) based on a combination of many factors, each of which may be weighed equally or differently. As such, selecting (308) the target storage device type that is intended to be used for servicing the one or more unprocessed write requests (306) may be carried out by applying one or more predetermined selection rules that take into account various parameters.

Readers will appreciate that by taking multiple factors into consideration when selecting (308) a target storage device type from the first type of storage device (322) and the second type of storage device (324), the storage array controller (304) can essentially make engineering tradeoffs through such a selection process. For example, in some instances a target storage device may be selected to promote wear leveling goals, even if such a selection results in a reduction of Input/Output Operations Per Second (TOPS') than would be experience by selecting another target storage device. Alternatively, in some instances a target storage device may be selected to promote achieve a higher number of TOPS than would be achieved by selecting another target storage device, even if such a selection exacerbates a discrepancy in wear amongst the storage devices.

The example method depicted in FIG. 3 also includes issuing (314) a first group of write requests (318) to the first type of storage device (322). The storage array controller (304) may issue (314) a first group of write requests (318) to the first type of storage device (322) may be carried out in response to selecting the first type (310) of storage device (322). The storage array controller (304) may issue (314) a first group of write requests (318) to the first type of storage device (322), for example, by sending one or more messages from the storage array controller (304) to the first type (310) of storage device (322) via a direct or indirect communications link between the storage array controller (304) and the first type (310) of storage device (322).

In the example method depicted in FIG. 3, the first group of write requests (318) may be addressed to one or more locations selected in dependence upon an expected address translation to be performed by the first type of storage device (322). The storage array controller (304) may attempt, for example, to service the first group of write requests (318) in a way that advances wear-leveling goals by writing the data to underutilized locations on the first type of storage device (322), to service the first group of write requests (318) in a way that advances performance goals by writing the data to a single erase block on the first type of storage device (322), and so on. As such, the storage array controller (304) may attempt to service the first group of write requests (318) in a way where data is written to strategically selected locations within the first type of storage device (322). Because the first type of storage device (322) performs an internal address translation that impacts the location within the first type of storage device (322) where the data will ultimately be stored, the storage array controller (304) may take the expected address translation to be performed by the first type of storage device (322) in account when addressing write requests, such that the data associated with such write requests may be written to the strategically selected locations within the first type of storage device (322) after the expected address translation has been performed by the first type of storage device (322).

The example method depicted in FIG. 3 also includes issuing (316) a second group of write requests (320) to the second type of storage device (324). The storage array controller (304) may issue (316) the second group of write requests (320) to the second type of storage device (324) in response to selecting the second type (312) of storage device (324). The storage array controller (304) may issue (316) a second group of write requests (320) to the second type of storage device (324), for example, by sending one or more messages from the storage array controller (304) to the second type (312) of storage device (324) via a direct or indirect communications link between the storage array controller (304) and the second type (312) of storage device (324).

In the example method depicted in FIG. 3, the second group of write requests (320) may be addressed to one or more locations selected in dependence upon a layout of memory in the second type of storage device (324). The storage array controller (304) may attempt, for example, to service the second group of write requests (320) in a way that advances wear-leveling goals by writing the data to underutilized locations on the second type of storage device (324), to service the second group of write requests (320) in a way that advances performance goals by writing the data to a single erase block on the second type of storage device (324), and so on. As such, the storage array controller (304) may attempt to service the second group of write requests (320) in a way where data is written to strategically selected locations within the second type of storage device (324). In order for the storage array controller (304) to strategically select such locations, however, the storage array controller (304) may need to utilize information describing the layout of memory in the second type of storage device (324). Such information can include, for example, the size of a single erase block on the second type of storage device (324), the beginning and ending addresses for a single erase block on the second type of storage device (324), information describing address ranges that can be accessed by each memory channel such that write requests can be issued over multiple memory channels in parallel, and so on.

Figure 4:
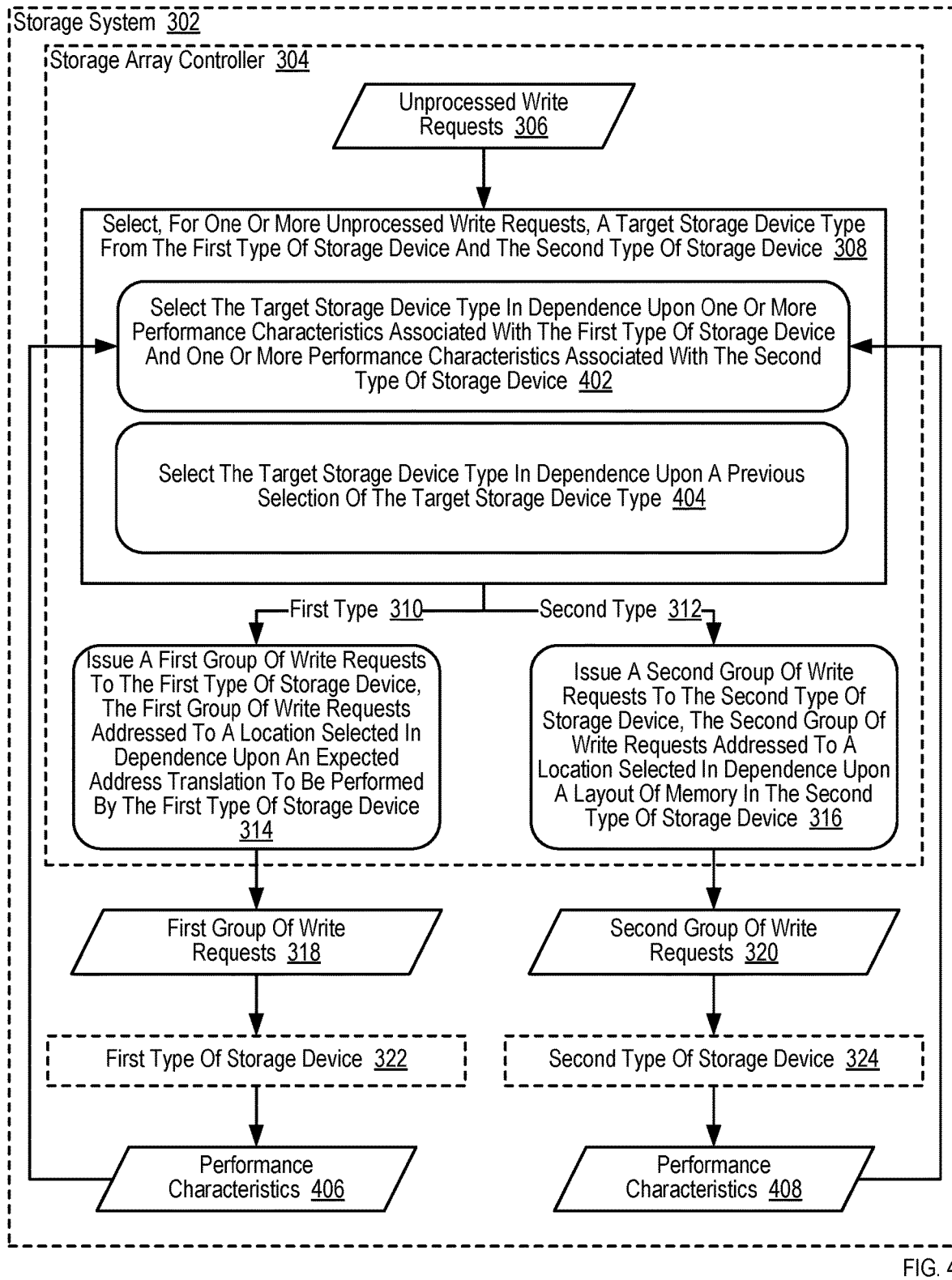
FIG. 4 sets forth a flow chart illustrating an additional example method for writing data in a storage system that includes a first type of storage device and a second type of storage device according to embodiments of the present disclosure.

For further explanation, FIG. 4 sets forth a flow chart illustrating an additional example method for writing data in a storage system (302) that includes a first type of storage device (322) and a second type of storage device (324) according to embodiments of the present disclosure. The example method depicted in FIG. 4 is similar to the example method depicted in FIG. 3, as the example method depicted in FIG. 4 also includes selecting (308) a target storage device type from the first type of storage device (322) and the second type of storage device (324), issuing (314) a first group of write requests (318) to the first type of storage device (322), and issuing (316) a second group of write requests (320) to the second type of storage device (324), as described above with reference to FIG. 3.

In the example method depicted in FIG. 4, selecting (308) the target storage device type from the first type of storage device (322) and the second type of storage device (324) can include selecting (402) the target storage device type in dependence upon one or more performance characteristics (406) associated with the first type of storage device (322) and one or more performance characteristics (408) associated with the second type of storage device (324). The performance characteristics (406, 408) may include information such as, for example, the amount of storage capacity available on a particular storage device, the amount of time that a particular storage device would require to service one or more write requests, the number of times that one or more portions of a particular storage device have been programmed and erased, and so on.

In the example method depicted in FIG. 4, the storage array controller (304) may track information associated with the performance of each type of storage device. For example, the storage array controller (304) may track the amount of time that each type of storage device required to complete one or more previous write operations, thereby enabling the storage array controller (304) to calculate an expected average amount of time that a particular storage device would require to service one or more write requests. Likewise, the storage array controller (304) may track information such as, for example, the amount of storage capacity available on a particular storage device, the number of times that one or more portions of a particular storage device have been programmed and erased, and so on.

In an alternative embodiment, another device in the storage system (302), or another device that is even separate from the storage system (302), may calculate or otherwise retain performance characteristics (406) associated with the first type of storage device (322) and performance characteristics (408) associated with the second type of storage device (324). In such an example, the storage array controller (304) may receive the performance characteristics (406) associated with the first type of storage device (322) and performance characteristics (408) associated with the second type of storage device (324) through direct or indirect communications with the device in the storage system (302) that calculates or otherwise retains performance characteristics (406) associated with the first type of storage device (322) and performance characteristics (408) associated with the second type of storage device (324).

In the example method depicted in FIG. 4, the storage array controller (304) may select (402) the target storage device type in dependence upon one or more performance characteristics (406) associated with the first type of storage device (322) and one or more performance characteristics (408) associated with the second type of storage device (324), for example, by applying one or more selection rules that utilize the performance characteristics (406) associated with the first type of storage device (322) and the performance characteristics (408) associated with the second type of storage device (324) as inputs. Such selection rules may weight different performance characteristics differently and may take into account factors other than the performance characteristics (406, 408) associated with the different types of storage devices (322, 324). For example, during high utilization periods where the storage system (302) is receiving a relatively large number of read requests and write requests, the selection rules may give a higher weighting to the amount of time that a particular storage device would require to service one or more write requests. During low utilization periods where the storage system (302) is receiving a relatively small number of read requests and write requests, however, the selection rules may give a higher weighting to the number of times that one or more portions of a particular storage device have been programmed and erased, so that wear leveling objectives can be pursued.

In the example method depicted in FIG. 4, selecting (308) the target storage device type from the first type of storage device (322) and the second type of storage device (324) can alternatively include selecting (404) the target storage device type in dependence upon a previous selection of the target storage device type. Selecting (404) the target storage device type in dependence upon a previous selection of the target storage device type may be carried out, for example, by selecting the same type of storage device that was chosen during a previous selection. Readers will appreciate that because of internal parallelization mechanisms implemented by a particular storage device (322, 324), improved performance may be achieved by sending batches of unprocessed write requests (306) to a particular storage device (322, 324), rather than frequently alternating between the two storage devices by sending a first unprocessed write request to the first type of storage device (322), sending a second unprocessed write request to the second type of storage device (324), sending a third unprocessed write request to the first type of storage device (322), and so on. As such, once a particular storage device (322, 324) has been selected to service an unprocessed write request, additional unprocessed write requests (306) may be directed to the same storage device (322, 324). In the example method depicted in FIG. 4, once a particular storage device (322, 324) has been selected to service an unprocessed write request, the storage array controller (304) may be configured to direct a predetermined number of subsequently received unprocessed write requests (306) to the particular storage device (322, 324) during a predetermined period of time.

Figure 5:
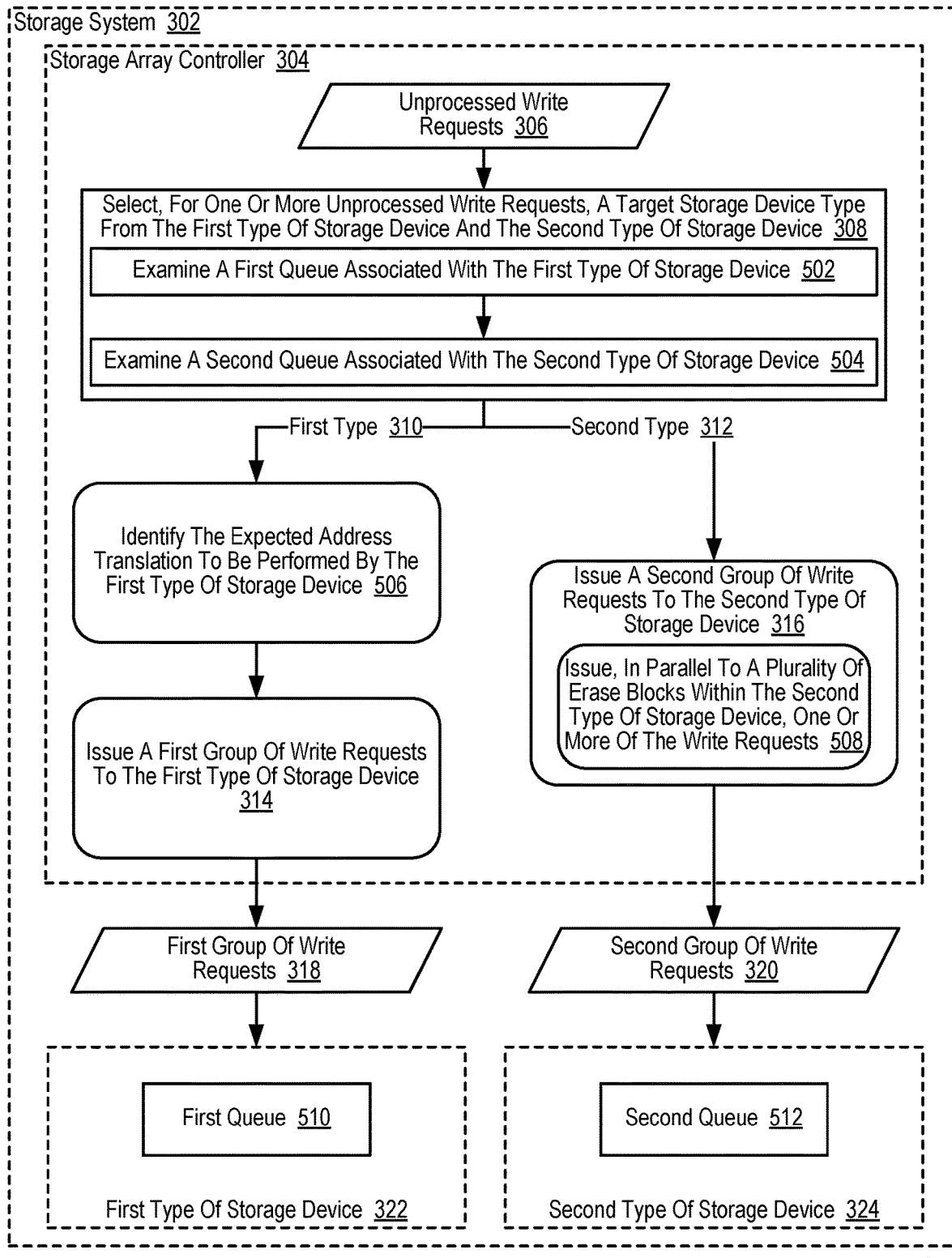
FIG. 5 sets forth a flow chart illustrating an additional example method for writing data in a storage system that includes a first type of storage device and a second type of storage device according to embodiments of the present disclosure.

For further explanation, FIG. 5 sets forth a flow chart illustrating an additional example method for writing data in a storage system (302) that includes a first type of storage device (322) and a second type of storage device (324) according to embodiments of the present disclosure. The example method depicted in FIG. 5 is similar to the example method depicted in FIG. 3, as the example method depicted in FIG. 5 also includes selecting (308) a target storage device type from the first type of storage device (322) and the second type of storage device (324), issuing (314) a first group of write requests (318) to the first type of storage device (322), and issuing (316) a second group of write requests (320) to the second type of storage device (324), as described above with reference to FIG. 3.

In the example method depicted in FIG. 5, selecting (308) a target storage device type from the first type of storage device (322) and the second type of storage device (324) can include examining (502) a first queue (510) associated with the first type of storage device (322). The first queue (510)

associated with the first type of storage device (322) may be embodied, for example, as a data structure maintained by the first type of storage device (322) that is used to store write requests that are to be serviced by the first type of storage device (322). Although the first queue (510) is depicted in FIG. 5 as residing on the first type of storage device (322), the first queue (510) may alternatively be maintained by another entity in the store system (302) such as, for example, by the storage array controller (304). Examining (502) the first queue (510) associated with the first type of storage device (322) may be carried out, for example, by inspecting the first queue (510) to determine how many pending write requests that are awaiting servicing by the first type of storage device (322). In such an example, the number of pending write requests that are awaiting servicing by the first type of storage device (322) may be utilized as a measure of how busy the first type of storage device (322) is, as a measure of how long the first type of storage device (322) would require to service another pending write request, and so on.

In the example method depicted in FIG. 5, selecting (308) a target storage device type from the first type of storage device (322) and the second type of storage device (324) can also include examining (504) a second queue (512) associated with the second type of storage device (324). The second queue (512) associated with the second type of storage device (324) may be embodied, for example, as a data structure maintained by the second type of storage device (324) that is used to store write requests that are to be serviced by the second type of storage device (324). Although the second queue (512) is depicted in FIG. 5 as residing on the second type of storage device (324), the second queue (512) may alternatively be maintained by another entity in the store system (302) such as, for example, by the storage array controller (304). Examining (504) the second queue (512) associated with the second type of storage device (324) may be carried out, for example, by inspecting the second queue (512) to determine how many pending write requests that are awaiting servicing by the second type of storage device (324). In such an example, the number of pending write requests that are awaiting servicing by the second type of storage device (324) may be utilized as a measure of how busy the second type of storage device (324) is, as a measure of how long the second type of storage device (324) would require to service another pending write request, and so on.

Readers will appreciate that by examining (502) the first queue (510) associated with the first type of storage device (322) and examining (504) the second queue (512) associated with the second type of storage device (324), the storage array controller (304) may select (308) a target storage device type from the first type of storage device (322) and the second type of storage device (324) by selecting the type of storage device that has the fewest number of pending write requests in its associated queue, by selecting the type of storage device that has a number of pending write requests in its associated queue that is most significantly above a target threshold, by selecting the type of storage device that has a number of pending write requests in its associated queue that is most significantly below a target threshold, and so on.

The example method depicted in FIG. 5 also includes identifying (506) the expected address translation to be performed by the first type of storage device (322). Identifying (506) the expected address translation to be performed by the first type of storage device (322) may be carried out, for example, by issuing write requests to a predetermined set of addresses and determining which addresses within the first type of storage device (322) that the data associated with such write requests were ultimately written to. In such a way, an address translation algorithm may be identified that would result in the address translations that actually occurred. In alternative embodiments, identifying (506) the expected address translation to be performed by the first type of storage device (322) may be carried out by examining address translation code in the first type of storage device (322), reviewing product information for the first type of storage device (322), and the storage array controller (304) receiving such information from a system administrator or other administrative entity via one or more user input devices and one or more user input interfaces.

In the example method depicted in FIG. 5, issuing (316) a second group of write requests (320) to the second type of storage device (324) can include issuing (508), in parallel to a plurality of erase blocks within the second type of storage device (324), a plurality of the write requests. An erase block represents a portion of a storage device that is erased during the execution of a single erase operation. The size of an erase block may be different than the size of data that can be written to a storage device as part of a write operation. Some storage devices such as SSDs, for example, permit a single write operation to write data to the storage device in 16 KB pages while a single erase operation erases a block that includes 256 16 KB pages. In such an example, issuing (508) one or more of the write requests in parallel to a plurality of erase blocks within the second type of storage device (324) may be carried out by the storage array controller (304) issuing a first write request addressed to a page within a first memory block in parallel with issuing a second write request addressed to a page within a second memory block. In such an example, the second type of storage device (324) may include a sufficient number of memory channels and other hardware components such that the first write request and the second write request may be executed in parallel. Readers will appreciate that the plurality of erase blocks may reside on at least two or more storage devices, the plurality of erase blocks may reside on the same storage devices, a plurality of the erase blocks may reside on a first storage device while other erase blocks reside on another storage device, and so on. Furthermore, although the example described above discusses only two write requests being issued in parallel, embodiments in which any larger number of write requests are issued in parallel are well within the scope of the present disclosure.

Example embodiments of the present disclosure are described largely in the context of a fully functional computer system for distributing management responsibilities for a storage system that includes a storage array controller and a plurality of storage devices. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure.

Although the examples described above depict embodiments where various actions are described as occurring within a certain order, no particular ordering of the steps is required. In fact, it will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
   selecting, based on expected address translations by one or more target storage devices, locations for issuing a first group of write requests; and
   issuing the first group of write requests to the one or more target storage devices, the first group of write requests addressed to the selected locations.

2. The method of claim 1 wherein selecting the locations further comprises selecting the locations based on at least one of a size of a single erase block on a first type of storage device; and the beginning and ending addresses for a single erase block on the first type of storage device.

3. The method of claim 1 further comprising selecting the one or more target storage devices in dependence upon one or more performance characteristics associated with the one or more target storage devices and one or more performance characteristics associated with a second storage device.

4. The method of claim 1 further comprising selecting the one or more target storage devices in dependence upon a previous selection of the type of the one or more target storage devices.

5. The method of claim 1 further comprising issuing, in parallel to a plurality of erase blocks within the one or more target storage devices, one or more of the write requests based on a layout of memory in the one or more target storage devices.

6. The method of claim 5 wherein the plurality of erase blocks reside on at least two or more storage devices.

7. An apparatus comprising a computer processor and a computer memory operatively coupled to the computer processor, the computer memory having disposed within it computer program instructions that, when executed by the computer processor, cause the apparatus to carry out:
   selecting, based on expected address translations by one or more target storage devices, locations for issuing a first group of write requests; and
   issuing the first group of write requests to the one or more target storage devices, the first group of write requests addressed to the selected locations.

8. The apparatus of claim 7 wherein selecting the locations further comprises selecting the locations based on at least one of a size of a single erase block on a first type of storage device; and the beginning and ending addresses for a single erase block on the first type of storage device.

9. The apparatus of claim 7 further comprising computer program instructions that, when executed by the computer processor, cause the apparatus to carry out selecting the one or more target storage devices in dependence upon one or more performance characteristics associated with the one or more target storage devices and one or more performance characteristics associated with a second storage device.

10. The apparatus of claim 7 further comprising computer program instructions that, when executed by the computer processor, cause the apparatus to carry out selecting the one or more target storage devices in dependence upon a previous selection of the type of the one or more target storage devices.

11. The apparatus of claim 7 further comprising computer program instructions that, when executed by the computer processor, cause the apparatus to carry out issuing, in parallel to a plurality of erase blocks within the one or more storage devices, one or more of the write requests based on a layout of memory in the one or more target storage devices.

12. The apparatus of claim 11 wherein the plurality of erase blocks reside on at least two or more storage devices.

13. A computer program product disposed upon a non-transitory computer readable medium, the computer program product comprising computer program instructions that, when executed, cause a computer to carry out:
   selecting, based on expected address translations by one or more target storage devices, locations for issuing a first group of write requests; and
   issuing the first group of write requests to the one or more target storage devices, the first group of write requests addressed to the selected locations.

14. The computer program product of claim 13 wherein selecting the locations further comprises selecting the locations based on at least one of a size of a single erase block on a first type of storage device; and the beginning and ending addresses for a single erase block on the first type of storage device.

15. The computer program product of claim 13 further comprising computer program instructions that, when executed by the computer processor, cause the computer to carry out selecting the one or more target storage devices in dependence upon one or more performance characteristics associated with the one or more target storage devices and one or more performance characteristics associated with a second storage device.

16. The computer program product of claim 13 further comprising computer program instructions that, when executed by the computer processor, cause the computer to carry out selecting the one or more target storage devices in dependence upon a previous selection of the type of the one or more target storage devices.

17. The computer program product of claim 13 further comprising computer program instructions that, when executed, cause a computer to carry out issuing, in parallel to a plurality of erase blocks within the one or more storage devices, one or more of the write requests based on a layout of memory in the one or more target storage devices.

* * * * *